L. W. PALMER.
HAY BALING MACHINE.
APPLICATION FILED JUNE 6, 1913.
1,081,624.
Patented Dec. 16, 1913.
2 SHEETS—SHEET 1.
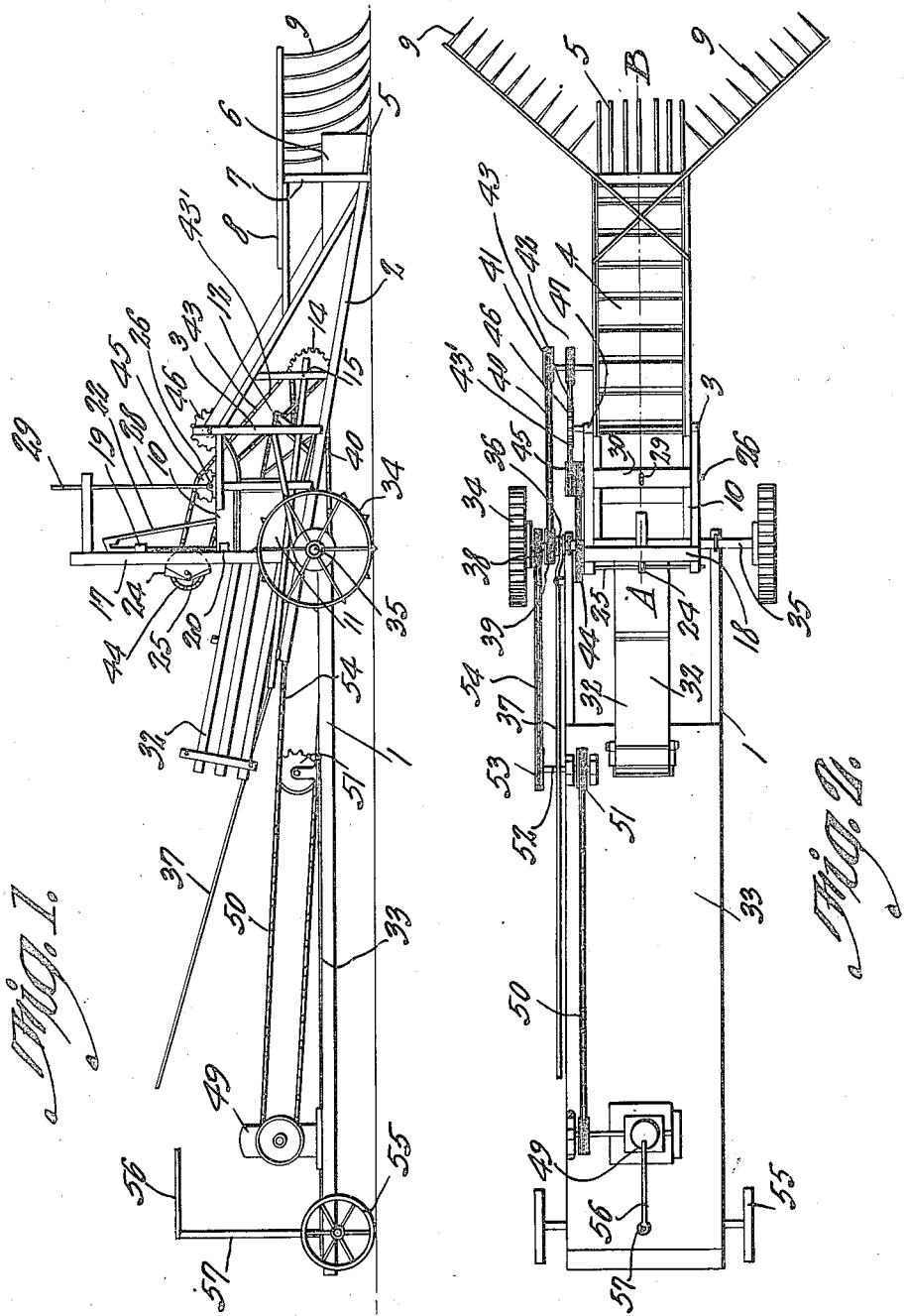
Witnesses
Inventor
L. W. Palmer
by
Attorneys

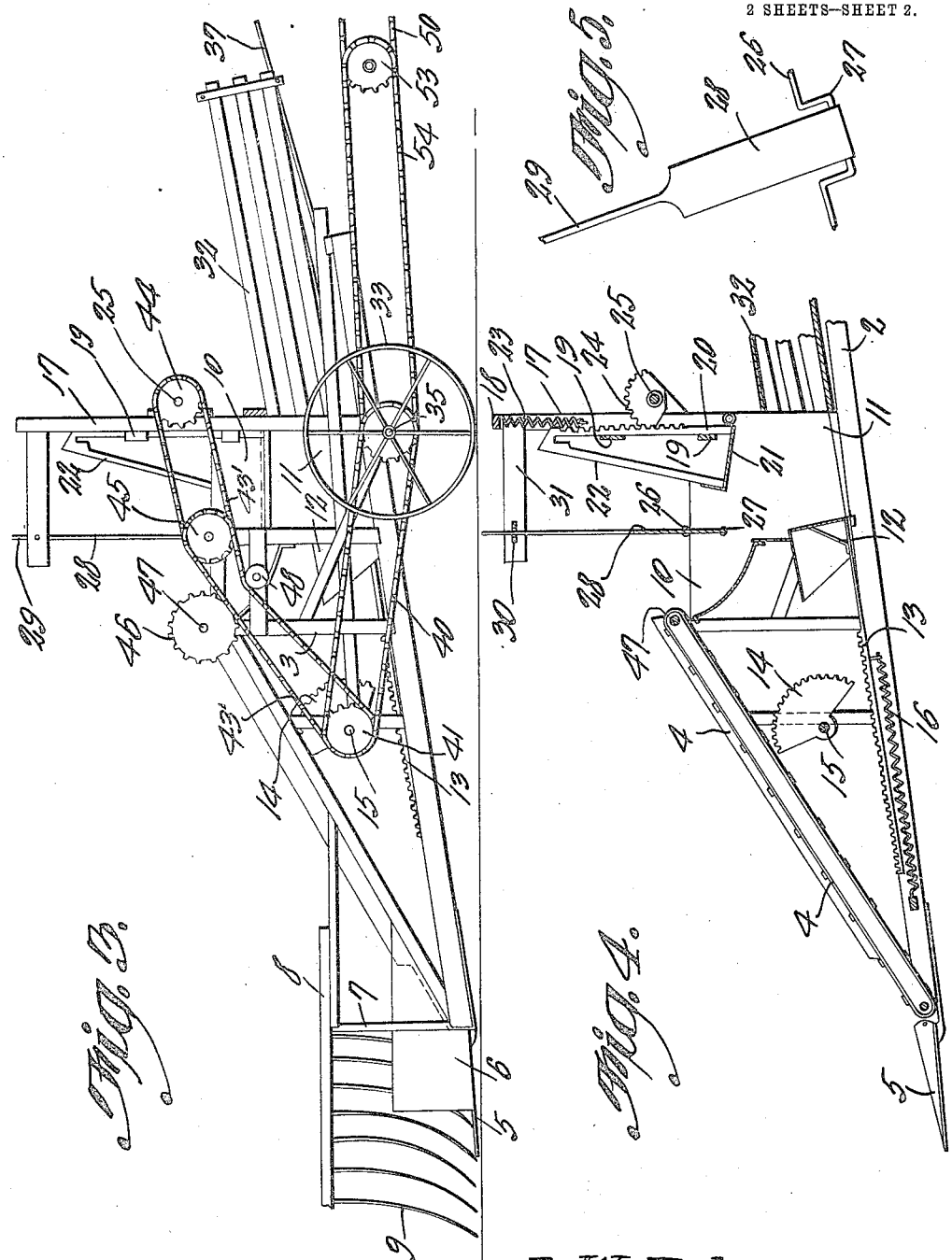

UNITED STATES PATENT OFFICE.

LAYTON W. PALMER, OF SILOAM SPRINGS, ARKANSAS, ASSIGNOR OF ONE-HALF TO ELTING MILLER, OF WYOMING, ILLINOIS.

HAY-BALING MACHINE.

1,081,624.  Specification of Letters Patent.  Patented Dec. 16, 1913.

Application filed June 6, 1913. Serial No. 772,156.

*To all whom it may concern:*

Be it known that I, LAYTON W. PALMER, a citizen of the United States, residing at Siloam Springs, in the county of Benton and State of Arkansas, have invented a new and useful Hay-Baling Machine, of which the following is a specification.

This invention relates to a machine for baling hay, one of its objects being to rake up the hay and subsequently bale it, the baling operation taking place while the machine is moving forward and collecting hay.

Another object is to provide a machine of this character which can be used either while in motion over the ground or while stationary, for forming bales.

A further object is to provide improved means for actuating the various parts of the baling mechanism and the means employed for feeding material to the same.

With the foregoing and other objects in view which will appear as the description proceeds, the invention resides in the combination and arrangement of parts and in the details of construction hereinafter described and claimed, it being understood that changes in the precise embodiment of the invention herein disclosed, can be made within the scope of what is claimed, without departing from the spirit of the invention.

In the accompanying drawings the preferred form of the invention has been shown.

In said drawings:—Figure 1 is a side elevation of the machine. Fig. 2 is a plan view thereof. Fig. 3 is an enlarged elevation of a portion of that side of the machine opposite to the one illustrated in Fig. 1. Fig. 4 is a vertical longitudinal section through a portion of the machine, said section being taken on the line A—B Fig. 2. Fig. 5 is a perspective view of the gathering device used in connection with the baling mechanism.

Referring to the figures by characters of reference 1 designates an elongated wheel supported structure provided with forwardly and downwardly inclined side beams 2 at its front end on which is arranged a framework 3 carrying an inclined endless conveyer 4. Gathering fingers 5 extend forwardly from between the front ends of the side beams 2 and the elevator or conveyer 4 extends from the rear end portions of these fingers. Side fenders 6 project forwardly from the side beams 2 and from points adjacent the sides of the lower portion of the conveyer 4 and standards 7 are secured to the front ends of the side beams 2 and support crossed bars 8 which diverge forwardly and are provided with rake teeth 9. Thus it will be seen that when the machine is moved forward, the rake teeth 9 will gather the hay and direct it inwardly to points where it will be gathered by the fingers 5 and thus engaged by the elevator 4 and carried upwardly and rearwardly.

Arranged back of and below the elevator 4 is a hopper 10 feeding into a press box 11 and a compressing piston 12 is mounted to reciprocate in the front wall of the press box 11 and is secured to a rack bar 13. This rack bar extends forwardly between the beams 2 and under the elevator 4 and is adapted to be engaged intermittently by a segmental gear 14 rotating with a transverse shaft 15. A spring 16 is secured to the rack bar 13 and serves to hold said rack bar normally drawn forward with the piston 12 practically removed from within the press box 11.

Standards 17 extend upwardly from the rear ends of the sides of the press box 11 and its hopper and are connected at their upper ends by a top strip 18. Guide members 19 connect the standards 17 and mounted within them is a rack bar 20 extending upwardly from a packing head 21. A brace 22 extends upwardly from the packing head and is connected at its upper end to the upper end of the rack bar 20. A spring 23 is connected to the rack bar and to the top strip 18 and serves to hold the packing head 21 yieldingly supported. A segmental gear 24 is adapted to mesh intermittently with the rack bar and rotates with a transverse shaft 25.

Extending transversely of the hopper and between the packing head 21 and the elevator 4 is a shaft 26 having a crank 27 to which is connected the lower end portion of a feeding blade 28. This blade, as shown particularly in Fig. 5, has a stem 29 projecting upwardly therefrom and guided within a cross strip 30 which is supported above the hopper 10 by means of arms 31.

A bale receiving box 32 extends rearwardly from the press box 11 and in alinement with the path of the piston 12. The structure 1 is provided with a platform which extends under and rearwardly beyond the box 32, this platform being illustrated at 33. Thus as the bales are discharged from the casing 32 they will be deposited on the platform 33 and after a desired number have been accumulated, they can be thrown off of the platform onto the ground and subsequently collected. By thus permitting the bales to accumulate and then depositing them in piles on the ground, the collection of the bales is greatly facilitated.

For the purpose of actuating the mechanism herein described, one of the supporting wheels 34 may be so connected to the axle 35 as to rotate it so that, when the machine moves forward, the rotating axle can be utilized for the purpose of driving the mechanism. A clutch member 36 is feathered on the axle 35 and can be shifted by means of a lever 37 so as to engage a clutch member 38 carried by a double sprocket 39 loose on the axle 35. A chain 40 extends from sprocket 39 to a sprocket 41 secured to the shaft 15 and another sprocket 42 is secured to the shaft 15 and transmits motion, through a chain drive 43, to a sprocket 44 secured to shaft 25. This chain drive consists of two endless chains 43′ engaging the respective sprockets 41 and 44 and two sprockets 45 secured to the shaft 26. One chain, 43′, passes under a sprocket 46 secured to the upper shaft 47 of the elevator 4. An idler 48 may be provided for holding the chain taut.

From the foregoing it will be seen that when the clutch members are in engagement with each other, the forward movement of the machine will result not only in the collection of the hay but also in the transmission of motion from the axle to the elevator, the piston 12 and the packing head 21, as well as the feeding blade 28. Thus the hay, after being collected by the fingers 5 of the rake will be conveyed upwardly by elevator 4 and deposited into hopper 10. The other hay will be gathered by the blade 28 the lower edge of which travels in a circle about the axis of shaft 26 and thus serves to scrape the hay rearwardly into position below the packing head 21. The gears 24 and 14 are so disposed that while the piston 12 is at rest, the gear 24 will drive the packing head 21 downwardly, thus placing the hay under compression and, as soon as the packing head passes upwardly out of the path of the piston 12, gear 14 will come into mesh with rack bar 13 and shift piston 12 forwardly so as to force the hay into the casing 42 where, after a sufficient amount has been accumulated, ties can be placed in position so as to complete the bale. The bale will subsequently be discharged onto the platform 33 and can afterward be dropped onto the ground as hereinbefore described.

If preferred, a motor, such as shown generally at 49 can be mounted on the rear portion of the platform 33 and can be used for transmitting motion, through a chain 50 to a sprocket 51 secured to a counter shaft 52, there being another sprocket 53 on this counter shaft which serves to drive a chain 54 extending to the double sprocket 39. Thus the motor can be used not only for the purpose of propelling the machine forward but also for actuating the collecting and compressing mechanism.

In the structure shown, the steering wheels 55 are located at the back of the machine and are adapted to be actuated by means of a handle or lever 56 connected to an upstanding post 57.

It is to be understood that the sprockets 45 and 46 may be provided with suitable shields so as to prevent the hay or other material being elevated, from becoming tangled in the sprockets.

What is claimed is:—

1. In a machine of the class described, the combination with a press box and a hopper for directing material therein, of a stationary guide, a feeding element mounted to slide and swing relative to the guide, and means for moving the lower end of said feeding element in a circle within the hopper.

2. In a machine of the class described, the combination with a press box and a hopper for directing material therein, of a packing element normally supported within the hopper, means for directing material into the hopper, a guide, a feeding element mounted to slide and swing relative to the guide, means for moving the lower end of said feeding element in a circle to direct material within said hopper under the packing device, and means for intermittently moving said packing device into the press box.

3. In a machine of the class described, the combination with a press box and a hopper for directing material thereinto, of a packing device normally supported in the hopper, means for intermittently shifting said device into the press box, means for elevating material to the hopper, and means mounted for oscillation within the hopper for directing the material in the hopper into position under the packing device, said means having its lower end movable in a circle.

4. In a machine of the class described, the combination with a press box having a hopper opening thereinto, a casing for receiving compressed material from the box, and a piston for compressing the material into the casing, of a packing device mounted to reciprocate within the hopper and press box in properly timed relation with the piston, means for elevating material to the hopper, a fixed guide, and means mounted to swing and slide relative to the guide and having its lower end mounted to travel in a circle for directing material in the hopper into position below the packing device.

5. In a machine of the class described, the combination with a rake, and an elevator extending from the rake, of a press box having a hopper for receiving material from the elevator, a packing head yieldingly supported within the hopper, means for intermittently shifting the packing head downwardly into the press box, a blade mounted to slide and swing relative to the hopper, and means for moving the lower end of the blade in a circle to direct material from the elevator into position under the packing head.

6. In a machine of the class described, the combination with gathering means and an elevator for conveying material therefrom, of a press box having a hopper for receiving material from the elevator, a piston mounted for reciprocation within the press box, a packing head yieldingly supported within the hopper, means for intermittently actuating the packing head to direct it downwardly into the press box in properly timed relation with the piston, a guide, a blade mounted to slide and swing relative thereto, and means for moving the lower end of the blade in a circle within the hopper to direct material from the conveyer and into position under the packing head.

7. In a machine of the class described, the combination with a wheel supported structure and gathering means at the front end thereof, of an elevator for receiving material from the gathering means, a press box having a hopper for receiving material from the elevator, a piston mounted for reciprocation within the press box, a packing head mounted for up and down movement within the hopper and press box in properly timed relation to the piston, a feeding member, a guide slidably engaged thereby, and means for moving the lower end of the feeding member in a circle within the hopper to direct material from the elevator and into position under the packing head.

8. In a machine of the class described, the combination with gathering means and an elevator for conveying material therefrom, of a press box having a hopper to receive material from the elevator, a piston mounted for reciprocation in the press box, a rack bar movable with the piston, yielding means for holding the piston normally in a predetermined position, a yieldingly supported packing head within the hopper, a rack bar movable therewith, segmental gears for engaging the respective rack bars for intermittently actuating the same in properly timed relation, and means movably mounted in the hopper for directing material from the elevator and into position under the packing head.

9. In a machine of the class described, the combination with a movably supported structure having a platform, a press box provided with a hopper, and a casing extending from the press box and discharging onto the platform, of gathering means, means for elevating material therefrom and to the hopper, a piston mounted for reciprocation within the press box and adapted to compress material within the casing, a packing head, means for operating the piston and packing head in properly timed relation, and means for directing material in the hopper from the elevator to a position under the packing head.

In testimony that I claim the foregoing as my own, I have hereto affixed my signature in the presence of two witnesses.

LAYTON W. PALMER.

Witnesses:
NELLE MOSS,
W. L. LINEBACK.